United States Patent
Sanchez (10) Patent No.: US 12,008,582 B2
(45) Date of Patent: Jun. 11, 2024

(54) SYSTEMS AND METHODS FOR GENERATING PERSONALIZED LANDING PAGES FOR USERS

(71) Applicant: BlueOwl, LLC, San Francisco, CA (US)

(72) Inventor: Kenneth Jason Sanchez, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 0 days.

(21) Appl. No.: 17/935,363

(22) Filed: Sep. 26, 2022

(65) Prior Publication Data
US 2023/0016696 A1    Jan. 19, 2023

Related U.S. Application Data (63) Continuation of application No. PCT/US2021/023634, filed on Mar. 23, 2021.
(Continued)

(51) Int. Cl.
G06F 3/048       (2013.01)
B60W 40/09       (2012.01)
(Continued)

(52) U.S. Cl.
CPC ........... G06Q 30/018 (2013.01); B60W 40/09 (2013.01); G01C 21/3469 (2013.01);
(Continued)

(58) Field of Classification Search
CPC ....... G05D 21/00; G06E 3/001; G06F 3/0482; G06F 3/0484; G06G 7/70; G06Q 30/0201;
(Continued)

(56) References Cited

U.S. PATENT DOCUMENTS 10,127,597 B2 * 11/2018 Gebhardt ................ H04L 67/02
10,830,605 B1 * 11/2020 Chintakindi ....... G01C 21/3484
(Continued)

FOREIGN PATENT DOCUMENTS

WO    2017/219121 A2    12/2017

OTHER PUBLICATIONS

American Heritage Dictionary, Driving, Print date Oct. 7, 2023, https://www.ahdictionary.com/word/search.html?q=driving (Year: 2023).*
(Continued)

*Primary Examiner* — David Phantana-angkool
(74) *Attorney, Agent, or Firm* — BRYAN CAVE LEIGHTON PAISNER LLP (57) ABSTRACT

Method and system for generating a personalized landing page for a user are disclosed. For example, the method includes receiving, by a computing device, one or more user data associated with the user, the one or more user data including one or more telematics data of the user, determining, by the computing device, one or more user interface features based at least in part upon the one or more user data, and generating, by the computing device, a personalized landing page customized for the user using the one or more user interface features to increase an effectiveness of the personalized landing page.

20 Claims, 5 Drawing Sheets

Related U.S. Application Data (60) Provisional application No. 63/000,874, filed on Mar. 27, 2020.

(51) Int. Cl.
| | | |
|---|---|---|
| *G01C 21/34* | (2006.01) | |
| *G01C 21/36* | (2006.01) | |
| *G05D 21/00* | (2006.01) | |
| *G06E 3/00* | (2006.01) | |
| *G06F 3/0482* | (2013.01) | |
| *G06F 3/0484* | (2022.01) | |
| *G06G 7/70* | (2006.01) | |
| *G06Q 30/018* | (2023.01) | |
| *G06Q 30/0201* | (2023.01) | |
| *G06Q 30/0208* | (2023.01) | |
| *G06Q 30/0283* | (2023.01) | |
| *G06Q 30/0601* | (2023.01) | |
| *G06Q 40/08* | (2012.01) | |
| *G06Q 50/40* | (2024.01) | |
| *G06T 7/00* | (2017.01) | |
| *G06T 11/00* | (2006.01) | |
| *G06V 20/10* | (2022.01) | |
| *G07C 5/08* | (2006.01) | |
| *G16Z 99/00* | (2019.01) | |

(52) U.S. Cl.
CPC ......... *G01C 21/3617* (2013.01); *G05D 21/00* (2013.01); *G06E 3/001* (2013.01); *G06F 3/0482* (2013.01); *G06F 3/0484* (2013.01); *G06G 7/70* (2013.01); *G06Q 30/0201* (2013.01); *G06Q 30/0208* (2013.01); *G06Q 30/0284* (2013.01); *G06Q 30/0641* (2013.01); *G06Q 40/08* (2013.01); *G06Q 50/40* (2024.01); *G06T 7/0002* (2013.01); *G06T 11/00* (2013.01); *G06V 20/188* (2022.01); *G07C 5/0841* (2013.01); *G16Z 99/00* (2019.02); *B60W 2540/30* (2013.01)

(58) Field of Classification Search
CPC ........... G06Q 30/0208; G06Q 30/0284; G06Q 30/0641; G06Q 40/08; G06Q 50/30; G06T 7/0002; G06T 11/00
See application file for complete search history.

(56) References Cited

U.S. PATENT DOCUMENTS

| | | | |
|---|---|---|---|
| 10,915,964 | B1 | 2/2021 | Purgatorio et al. |
| 11,341,525 | B1* | 5/2022 | Sanchez .............. G06F 21/6263 |
| 2003/0195694 | A1 | 10/2003 | Kozak et al. |
| 2004/0049424 | A1 | 3/2004 | Murray et al. |
| 2005/0154669 | A1 | 7/2005 | Streetman |
| 2008/0046277 | A1 | 2/2008 | Stamets |
| 2009/0043687 | A1 | 2/2009 | van Soestbergen et al. |
| 2009/0210295 | A1 | 8/2009 | Edholm et al. |
| 2009/0292617 | A1 | 11/2009 | Sperling et al. |
| 2011/0093321 | A1 | 4/2011 | Streetman |
| 2013/0080053 | A1 | 3/2013 | Rakshit |
| 2013/0218427 | A1 | 8/2013 | Mukhopadhyay et al. |
| 2013/0282454 | A1 | 10/2013 | Alpert et al. |
| 2014/0019179 | A1 | 1/2014 | Gosalvez et al. |
| 2014/0040029 | A1* | 2/2014 | Vhora ................... H04L 67/535 705/14.54 |
| 2014/0081579 | A1 | 3/2014 | Tyburski |
| 2014/0099000 | A1 | 4/2014 | Shamir et al. |
| 2014/0107927 | A1 | 4/2014 | Rojas |
| 2014/0354630 | A1 | 12/2014 | Kim et al. |
| 2015/0148005 | A1 | 5/2015 | Chau et al. |
| 2015/0206248 | A1 | 7/2015 | Kornweibel et al. |
| 2015/0276419 | A1 | 10/2015 | Hashem et al. |
| 2015/0371251 | A1 | 12/2015 | Limbasia et al. |
| 2016/0232550 | A1 | 8/2016 | Fletcher et al. |
| 2016/0292768 | A1 | 10/2016 | Needham |
| 2016/0343037 | A1* | 11/2016 | Nicholas ............ G06Q 30/0269 |
| 2017/0069016 | A1 | 3/2017 | Rackley et al. |
| 2017/0151917 | A1 | 6/2017 | Bradley et al. |
| 2017/0351978 | A1 | 12/2017 | Bellowe |
| 2018/0033352 | A1 | 2/2018 | Kufus |
| 2019/0026364 | A1 | 1/2019 | Sankovsky |
| 2019/0026788 | A1* | 1/2019 | Garrity .............. G06Q 30/0277 |
| 2019/0162154 | A1 | 5/2019 | Pompea et al. |
| 2019/0213097 | A1 | 7/2019 | Jin et al. |
| 2019/0303668 | A1 | 10/2019 | King |
| 2020/0027102 | A1 | 1/2020 | Xu et al. |
| 2020/0029490 | A1 | 1/2020 | Bertucci et al. |
| 2020/0041290 | A1* | 2/2020 | Schmelzer ....... G06Q 10/06393 |
| 2020/0074492 | A1 | 3/2020 | Scholl et al. |
| 2020/0103892 | A1* | 4/2020 | Cella ...................... G06Q 10/04 |
| 2020/0211122 | A1* | 7/2020 | Chen ..................... G06Q 40/08 |
| 2020/0242513 | A1 | 7/2020 | Blayvas et al. |
| 2021/0010816 | A1* | 1/2021 | Schmelzer ............. G06Q 50/40 |
| 2022/0189482 | A1* | 6/2022 | Penilla ................ B60R 16/0373 |
| 2023/0016696 | A1* | 1/2023 | Sanchez ................ G06F 16/958 |
| 2023/0186878 | A1* | 6/2023 | Wipperfürth ....... G06F 3/04847 715/772 |

OTHER PUBLICATIONS

American Heritage Dictionary, Telematics, Print date Oct. 7, 2023 https://www.ahdictionary.com/word/search.html?q=telematics (Year: 2023).*

International Search Report and Written Opinion received for PCT Patent Application No. PCT/US21/23555, dated Jun. 8, 2021, 15 pages.

International Search Report and Written Opinion received for PCT Patent Application No. PCT/US21/23556, dated Jun. 8, 2021, 11 pages.

International Search Report and Written Opinion received for PCT Patent Application No. PCT/US21/23579, dated Jun. 8, 2021, 9 pages.

International Search Report and Written Opinion received for PCT Patent Application No. PCT/US21/23621, dated Jun. 10, 2021, 8 pages.

International Search Report and Written Opinion received for PCT Patent Application No. PCT/US21/23626, dated Jun. 9, 2021, 8 pages.

International Search Report and Written Opinion received for PCT Patent Application No. PCT/US21/23628, dated Jun. 9, 2021, 8 pages.

International Search Report and Written Opinion received for PCT Patent Application No. PCT/US21/23634, dated Jun. 4, 2021, 12 pages.

International Search Report and Written Opinion received for PCT Patent Application No. PCT/US21/23639, dated Jun. 7, 2021, 8 pages.

International Search Report and Written Opinion received for PCT Patent Application No. PCT/US21/23645, dated Jun. 9, 2021, 8 pages.

International Search Report and Written Opinion received for PCT Patent Application No. PCT/US21/23668, dated Jun. 9, 2021, 11 pages.

Holden. Give Now or Give Later? Dec. 20, 2011. The Givewell Blog, [archived on Jan. 9, 2012] [retrieved from internet archive on Jul. 21, 2023] <URL: https://web.archive.org/web/20120109075626/https://blog.givewell.org/2011/12/20/give-now-or-give-later/> (Year: 2011).

B Libai et al. Setting Referral Fees in Affiliate Marketing. Journal of Service Research. 2003. [retrieved from internet on Apr. 8, 2023] <URL: https://www.runi.ac.il/yedion/facultypublications/getfile.ashx?username=ebialogorsky&fileType=3&publicationId=628> (Year: 2003).

\* cited by examiner

SYSTEMS AND METHODS FOR GENERATING PERSONALIZED LANDING PAGES FOR USERS

CROSS-REFERENCE TO RELATED APPLICATIONS

This application is a continuation of International Application No. PCT/US2021/023634, filed Mar. 23, 2021, which claims priority to U.S. Provisional Patent Application No. 63/000,874, filed Mar. 27, 2020, the entire disclosures of which are incorporated by reference herein.

FIELD OF DISCLOSURE

Some embodiments of the present disclosure are directed to generating a personalized landing page for a user. More particularly, certain embodiments of the present disclosure provide systems and methods for generating a personalized landing page for a user based on one or more user data associated with the user. Merely by way of example, the present disclosure has been applied to generating a personalized landing page for a user based at least in part upon telematics data of the user. But it would be recognized that the present disclosure has much broader range of applicability.

BACKGROUND OF THE DISCLOSURE

In recent years, there has been an increasing number of online marketing targeting customers. Hence it is highly desirable to develop more accurate techniques for generating a landing page tailored to each customer to improve customer engagement.

BRIEF SUMMARY OF THE DISCLOSURE

Some embodiments of the present disclosure are directed to generating a personalized landing page for a user. More particularly, certain embodiments of the present disclosure provide methods and systems for generating a personalized landing page for a user based on one or more user data associated with the user. Merely by way of example, the present disclosure has been applied to generating a personalized landing page for a user based at least in part upon telematics data of the user. But it would be recognized that the present disclosure has much broader range of applicability.

According to some embodiments, a method for generating a personalized landing page for a user includes receiving one or more user data associated with the user. The one or more user data includes one or more telematics data of the user. The method further includes determining one or more user interface features based at least in part upon the one or more user data. Additionally, the method includes generating a personalized landing page customized for the user using the one or more user interface features to increase an effectiveness of the personalized landing page.

According to some embodiments, a computing device for generating a personalized landing page for a user includes one or more processors and a memory that stores instructions for execution by the one or more processors. The instructions, when executed, cause the one or more processors to receive one or more user data associated with the user. The one or more user data includes one or more telematics data of the user. Further, the instructions, when executed, cause the one or more processors to determine one or more user interface features based at least in part upon the one or more user data. Additionally, the instructions, when executed, cause the one or more processors to generate a personalized landing page customized for the user using the one or more user interface features to increase an effectiveness of the personalized landing page.

According to some embodiments, a non-transitory computer-readable medium stores instructions for generating a personalized landing page for a user. The instructions are executed by one or more processors of a computing device. The non-transitory computer-readable medium includes instructions to receive one or more user data associated with the user. The one or more user data includes one or more telematics data of the user. Further, the non-transitory computer-readable median includes instructions to determine one or more user interface features based at least in part upon the one or more user data. Additionally, the non-transitory computer-readable medium includes instructions to generate a personalized landing page customized for the user using the one or more user interface features to increase an effectiveness of the personalized landing page.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Some embodiments of the present disclosure are directed to generating a personalized landing page for a user. More particularly, certain embodiments of the present disclosure provide methods and systems for generating a personalized landing page for a user based on one or more user data associated with the user. Merely by way of example, the present disclosure has been applied to generating a personalized landing page for a user based at least in part upon telematics data of the user. But it would be recognized that the present disclosure has much broader range of applicability.

Figure 1:
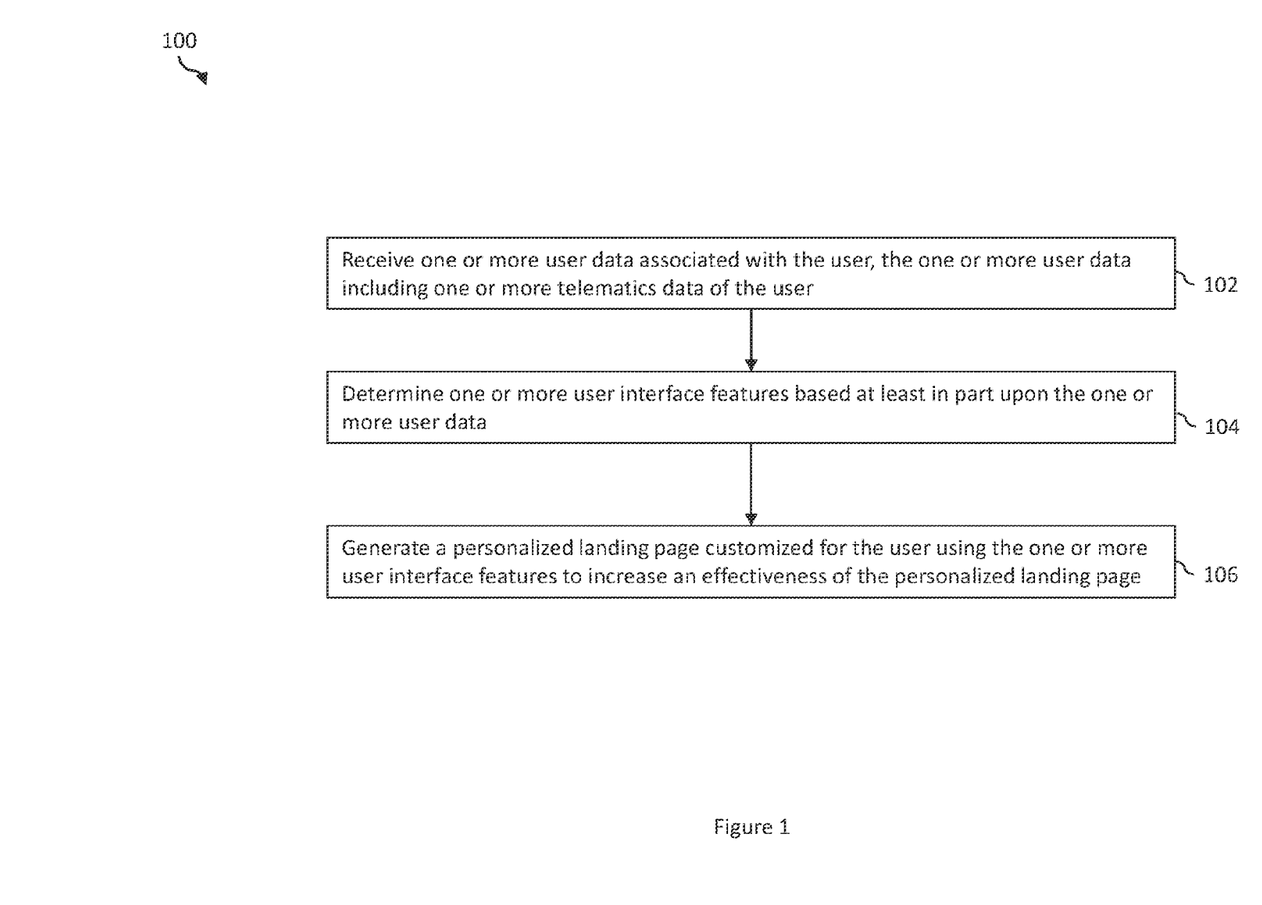
FIG. 1 is a simplified method for generating a personalized landing page for a user according to certain embodiments of the present disclosure.

I. One or More Methods for Generating Personalized Landing Page for Users According to Certain Embodiments FIG. 1 is a simplified diagram showing a method 100 for generating a personalized landing page for a user according to certain embodiments of the present disclosure. This diagram is merely an example, which should not unduly limit the scope of the claims. One of ordinary skill in the art would recognize many variations, alternatives, and modifications. In the illustrative embodiment, the method 100 is performed by a computing device (e.g., a server 406). However, it should be appreciated that, in some embodiments, some of the method 100 is performed by any computing device (e.g., a mobile device 402).

The method 100 includes process 102 for receiving one or more user data associated with the user, process 104 for determining one or more user interface features based at least in part upon the one or more user data, and process 106 for generating a personalized landing page customized for the user using the one or more user interface features to increase an effectiveness of the personalized landing page. In the illustrative embodiment, the personalized landing page includes one or more advertised products and/or the services that the user is likely be interested in. According to some embodiment, the personalized landing page is embodied as a page (e.g., a main page) on an application installed on a mobile device of the user, such that when the user access the application, the landing page is presented to the user. Additionally or alternatively, according to certain embodiment, the personalized landing page is embodied as a web page that appears when the user clicks on an advertisement on a website, a search engine result link, and/or an application installed on a mobile device of the user.

Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, although the method 100 is described as performed by the computing device above, some or all processes of the method are performed by any computing device or a processor directed by instructions stored in memory. As an example, some or all processes of the method are performed according to instructions stored in a non-transitory computer-readable medium.

Specifically, at the process 102, the one or more user data includes one or more telematics data of the user. The telematics data includes information related to one or more driving behaviors of the user. As an example, the one or more driving behaviors represent a manner in which the user has operated a vehicle. For example, the driving behaviors indicate the user's driving habits and/or driving patterns. Additionally, according to some embodiments, the telematics data further includes information related to one or more places that the user has been. As discussed below, the telematics data is used to determine one or more lifestyle characteristics of the user according to some embodiments.

According to some embodiments, the telematics data is received, obtained, or otherwise collected from one or more sensors associated with one or more vehicles of the user. For example, the one or more sensors include any type and number of accelerometers, gyroscopes, magnetometers, location sensors (e.g., GPS sensors), tilt sensors, yaw rate sensors, speedometers, steering angle sensors, brake sensors, proximity detectors, and/or any other suitable sensors that measure vehicle state and/or operation. In certain embodiments, the one or more sensors are part of or located in the one or more vehicles. In some embodiments, the one or more sensors are part of a computing device (e.g., a mobile device of the user) that are communicatively coupled to the one or more vehicles while the user is operating one of the one or more vehicles. In other embodiments, the one or more sensors are part of a computing device (e.g., a mobile device of the user) that is located inside a vehicle while the user is operating the vehicle. According to certain embodiments, the telematics data is collected continuously or at predetermined time intervals. According to some embodiments, the telematics data is collected based on a triggering event. For example, the telematics data is collected when each sensor has acquired a threshold amount of sensor measurements. According to other embodiments, the telematics data may be received, obtained, or otherwise collected from a server (e.g., a server 406) associated with an insurance provider.

At the process 104, the one or more user interface features are components that make up a personalized landing page. In the illustrative embodiment, the personalized landing page includes one or more advertised products and/or the services that the user is likely be interested in. To increase an effectiveness of the personalized landing, page, the one or more user interface features are determined based on the user data to generate a personalized landing page that is customized and tailored to the user.

For example, the one or more user interface features are texts and/or images. According to some embodiments, the one or more user interface features are selected from pre-existing user interface features by determining or predicting one or more lifestyle characteristics of the user based on the user data Based upon the one or more lifestyle characteristics of the user, the computing device determines or predicts things that the user is interested in, the user prefers, and/or the user values (e.g., money, environment, and/or health). As an example, the one or more lifestyle characteristics of the user are determined or predicted based on the telematics data of the user. As described above, the telematics data includes information related to one or more driving behaviors of the user, which are utilized to further determine or otherwise predict one or more lifestyle characteristics of the user.

As an example, if the telematics data of the user indicates that the user does not brake a lot, the computing device may determine that the user is likely be interested in saving money. Accordingly, the computing device may select one or more user interface features that are related to saving money. For example, the one or more user interface features may include triggering phrases, such as "save money now," "discount today only," and/or "tips to help you save money fast." In other example, the computing device may determine that the user is likely be interested in reducing carbon emissions based on the user's driving behaviors. Accordingly, the computing device may select one or more user interface features that are related to reducing carbon emissions. For example, the one or more user interface features may include triggering phrases, such as "save the environment," "save the earth," "eco-friendly," "green," "non-toxic," "organic," "recyclable," and/or "what you can do to save the earth."

Additionally or alternatively, in some embodiments, the user data includes a number of eternal trees the user has earned and/or planted. Additionally or alternatively, in certain embodiments, the user data includes how the user ranks compared to other users in terms of carbon neutrality (e.g., an efficient fuel usage) and/or driving ability (e.g., mindful driving). Accordingly to certain embodiments, these additional user data is used to determine or predict one or more lifestyle characteristics of the user.

At the process 106, the one or more user interface features are organized to generate a personalized landing page that is customized to the user to increase an effectiveness of the personalized landing page. In other words, one or more selected user interface features are associated with one or more relevant products and/or services to be advertised to the user on the personalized landing page. The effectiveness of the personalized landing page depends on the likelihood of the user to purchase the one or more products and/or services that are offered on the personalized landing page. According to the illustrative embodiment, the likelihood of the user purchasing a product and/or a service increases when the selected user interface features include texts, phrases, and/or images that trigger the user's interest.

Additionally, according to certain embodiments, a number of eternal trees that the user has earned and/or planted is used to select one or more user interface features and is shown as part of the personalized landing page. Additionally or alternatively, according to some embodiments, the ranking of the user in terms of carbon neutrality (e.g., an efficient fuel usage) and/or driving ability (e.g., mindful driving) compared to other users are used to select one or more user interface features and is shown as part of the personalized landing page.

Figure 2:
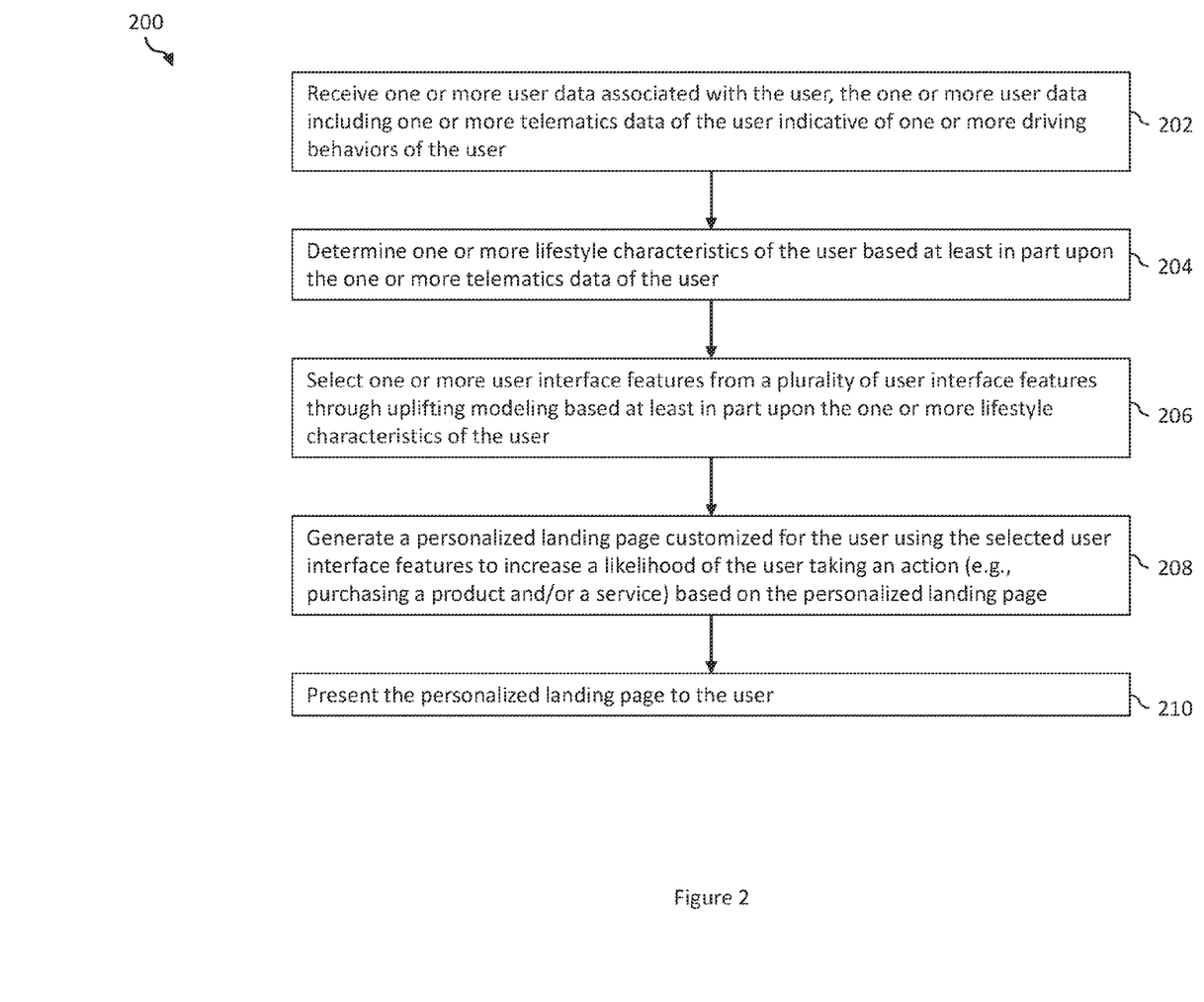
FIG. 2 is a simplified method for generating a personalized landing page for a user according to some embodiments of the present disclosure.

FIG. 2 is a simplified method for generating a personalized landing page for a user according to certain embodiments of the present disclosure. This diagram is merely an example, which should not unduly limit the scope of the claims. One of ordinary skill in the art would recognize many variations, alternatives, and modifications. In the illustrative embodiment, the method 200 is performed by a computing device (e.g., a server 406). However, it should be appreciated that, in some embodiments, some of the method 200 is performed by any computing device (e.g., a mobile device 402).

The method 200 includes process 202 for receiving one or more user data associated with the user, process 204 for determining one or more lifestyle characteristics of the user, process 206 for selecting one or more user interface features from a plurality of user interface features based at least in part upon the one or more lifestyle characteristics of the user, process 208 for generating a personalized landing page customized for the user using the one or more user interface features to increase an effectiveness of the personalized landing page, and process 210 for presenting the personalized landing page to the user. In the illustrative embodiment, the personalized landing page includes one or more advertised products and/or the services that the user is likely be interested in. According to some embodiment, the personalized landing page is embodied as a page (e.g., a main page) on an application installed on a mobile device of the user, such that when the user access the application, the landing page is presented to the user. Additionally or alternatively, according to certain embodiment, the personalized landing page is embodied as a web page that appears when the user clicks on an advertisement on a website, a search engine result link, and/or an application installed on a mobile device of the user.

Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, although the method 200 is described as performed by the computing device above, some or all processes of the method are performed by any computing device or a processor directed by instructions stored in memory. As an example, some or all processes of the method are performed according to instructions stored in a non-transitory computer-readable medium.

Specifically, at the process 202, the one or more user data includes one or more telematics data of the user. The telematics data includes information related to one or more driving behaviors of the user. As an example, the one or more driving behaviors represent a manner in which the user has operated a vehicle. For example, the driving behaviors indicate the users driving habits and/or driving patterns. Additionally, according to some embodiments, the telematics data further includes information related to one or more places that the user has been. As discussed below, the telematics data is used to determine one or more lifestyle characteristics of the user according to some embodiments.

According to some embodiments, the telematics data is received, obtained, or otherwise collected from one or more sensors associated with one or more vehicles of the user. For example, the one or more sensors include any type and number of accelerometers, gyroscopes, magnetometers, location sensors (e.g., GPS sensors), tilt sensors, yaw rate sensors, speedometers, steering angle sensors, brake sensors, proximity detectors, and/or any other suitable sensors that measure vehicle state and/or operation. In certain embodiments, the one or more sensors are part of or located in the one or more vehicles. In some embodiments, the one or more sensors are part of a computing device (e.g., a mobile device of the user) that are communicatively coupled to the one or more vehicles while the user is operating one of the one or more vehicles. In other embodiments, the one or more sensors are part of a computing device (e.g., a mobile device of the user) that is located inside a vehicle while the user is operating the vehicle. According to certain embodiments, the telematics data is collected continuously or at predetermined time intervals. According to some embodiments, the telematics data is collected based on a triggering event. For example, the telematics data is collected when each sensor has acquired a threshold amount of sensor measurements. According to other embodiments, the telematics data may be received, obtained, or otherwise collected from a server (e.g., a server 406) associated with an insurance provider.

At the process 204, the one or more lifestyle characteristics of the user is determined based at least in part upon the one or more telematics data of the user. As described above, the telematics data of the user includes information related to one or more driving behaviors of the user. According to certain embodiments, the one or more driving, behaviors are utilized to further determine or otherwise predict one or more lifestyle characteristics of the user. As described in method 300 of FIG. 3, in the illustrative embodiments, machine learning is used to determine or predict one or more lifestyle characteristics of the user based on the telematics data. Based on the one or more lifestyle characteristics of the user, the one or more user interface features are selected from the preexisting user interface features. For example, if the telematics data of the user indicates that the user does not brake a lot, the computing device may determine that the user is likely be interested in saving money and/or saving environment.

At the process 206, the one or more user interface features are components that make up a personalized landing page. In the illustrative embodiment, the personalized landing page includes one or more advertised products and/or the services that the user is likely be interested in. To increase an effectiveness of the personalized landing page, the one or more user interface features are determined based on the user data to generate a personalized landing page that is customized and tailored to the user.

For example, the one or more user interface features are texts and/or images. According to some embodiments, the one or more user interface features are selected from pre-existing user interface features by determining or predicting one or more lifestyle characteristics of the user based on the user data. Based upon the one or more lifestyle characteristics of the user, the computing device determines or predicts things that the user is interested in, the user prefers, and/or the user values (e.g., money, environment, and/or health). As an example, the one or more lifestyle characteristics of the user are determined or predicted based on the telematics data of the user. As described above, the telematics data includes information related to one or more driving behaviors of the user, which are utilized to further determine or otherwise predict one or more lifestyle characteristics of the user.

As described above, if the telematics data of the user indicates that the user does not brake a lot, the computing device may determine that the user is likely be interested in saving money. Accordingly, the computing device may select one or more user interface features that are related to saving money. For example, the one or more user interface features may include triggering phrases, such as "save money now," "discount today only," and/or "tips to help you save money fast." In other example, the computing device may determine that the user is likely be interested in reducing carbon emissions based on the user's driving behaviors. Accordingly, the computing device may select one or more user interface features that are related to reducing carbon emissions. For example, the one or more user interface features may include triggering phrases, such as "save the environment," "save the earth," "eco-friendly," "green," "non-toxic," "organic," "recyclable," and/or "what you can do to save the earth."

Additionally or alternatively, in some embodiments, the user data includes a number of eternal trees the user has earned and/or planted. Additionally or alternatively, in certain embodiments, the user data includes how the user ranks compared to other users in terms of carbon neutrality (e.g., an efficient fuel usage) and/or driving ability (e.g., mindful driving). Accordingly to certain embodiments, these additional user data is used to determine or predict one or more lifestyle characteristics of the user.

As an example, the one or more user interface features are selected from the preexisting user interface features through uplifting modeling based upon the one or inure lifestyle characteristics of the user. Additionally or alternatively, the one or more user interface features are selected using historical data of the user and/or one or more users whose demographic information (e.g., age, race, ethnicity, gender, marital status, income, education, and/or employment) is similar to the user. Additionally or alternatively, the one or more user interface features are selected based on responses collected from volunteers. Additionally or alternatively, the one or more user interface features are selected based on machine learning algorithms.

At the process 208, the one or more user interface features are organized to generate a personalized landing page that is customized to the user to increase an effectiveness of the personalized landing page. In other words, one or more selected user interface features are associated with one or more relevant products and/or services to be advertised to the user on the personalized landing page. The effectiveness of the personalized landing page depends on the likelihood of the user to purchase the one or more products and/or services that are offered on the personalized landing page. According to the illustrative embodiment, the likelihood of the user purchasing a product and/or a service increases when the selected user interface features include texts, phrases, and/or images that trigger the user's interest.

Additionally, according to certain embodiments, a number of eternal trees that the user has earned and/or planted is used to select one or more user interface features and is shown as pail of the personalized landing page. Additionally or alternatively, according to some embodiments, the ranking of the user in terms of carbon neutrality (e.g., an efficient fuel usage) and/or driving ability (e.g., mindful driving) compared to other users are used to select one or more user interface features and is shown as part of the personalized landing page.

At the process 210, the personalized landing page is presented to the user via a user's device a mobile device 402). According to some embodiments, the computing device may transmit a notification to the user on the user's device with a link to the personalized landing page, According to certain embodiments, the computing device may be in communication with an application that is installed on a mobile device of the user (e.g., a mobile device 402). In such embodiments, the personalized landing page may be presented to the user when the user accesses the application. Additionally or alternatively, the computing device may transmit a notification to the user indicating that a special offer is waiting for the user on the application.

Figure 3:
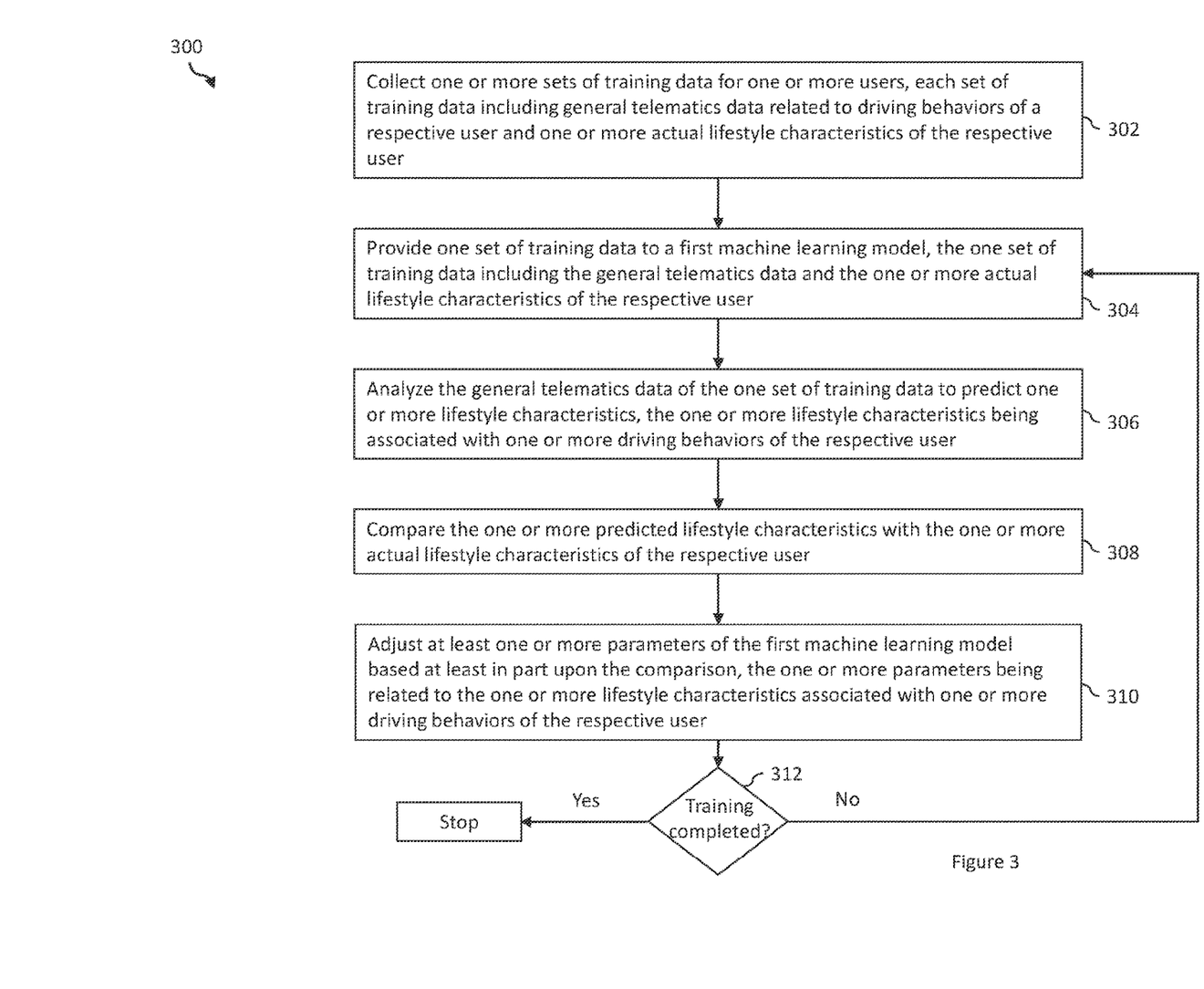
FIG. 3 is a simplified method for training a machine learning model according to certain embodiments of the present disclosure.

II. One or More Methods for Training Machine Learning Models According to Certain Embodiments FIG. 3 is a simplified method for training a machine learning model for determining one or more lifestyle characteristics of a user based at least in part upon telematics data of the user according to some embodiments of the present disclosure. As described above, the lifestyle characteristics of the user may affect driving behaviors (e.g., various driving maneuvers) of the user. For example, the lifestyle characteristics may include frugal, mindful of the environment, anxiety, hostility, excitement seeking, reckless, aggression, altruism, normlessness, active, cautious, and/or law-abiding. As such, the lifestyle characteristics of the user may be predicted based at least in part upon the driving behaviors of the user. As described below, the machine learning model is trained to determine lifestyle characteristics of a particular user based upon collected telematics data.

This diagram is merely an example, which should not unduly limit the scope of the claims. One of ordinary skill in the art would recognize many variations, alternatives, and modifications. The method 300 includes process 302 for collecting one or more sets of training data for one or more users, process 304 for providing one set of training data to a machine learning model, process 306 for analyzing the general telematics data of the one set of training data to predict one or more lifestyle characteristics, process 308 for comparing the one or more predicted lifestyle characteristics with the one or more actual lifestyle characteristics of the respective user, process 310 for adjusting at least one or more parameters of the machine learning model based at least in part upon the comparison, the one or more parameters being related to the one or more lifestyle characteristics associated with one or more driving behaviors of the respective user, and process 312 for determining whether the training is completed.

Specifically, at the process 302, each set of training data includes general telematics data of a respective user and one or more actual lifestyle characteristics of the respective user. The general telematics data is related to driving behaviors of the respective user.

At the process 304, the one set of training data includes the general telematics data and the one or more actual lifestyle characteristics of the respective user. According to some embodiments, the actual lifestyle characteristics of the respective user are received from the respective user. For example, one or more questions may be presented to the respective user to inquire actual lifestyle characteristics of the respective user. In response, one or more responses may be received from the respective user indicating one or more actual lifestyle characteristics of the respective user. Additionally, according to some embodiments, the actual lifestyle characteristics of the respective user are determined based on sensor data associated with the respective user. As an example, the sensor data is collected via one or more wearable device and/or a mobile device of the respective user.

At the process 306, the general telematics data of the respective user is analyzed to determine one or more lifestyle characteristics of with the user. As described above, the one or more lifestyle characteristics are associated with one or more driving behaviors of the respective user.

At the process 308, the one or more predicted lifestyle characteristics of the respective user are compared with the one or more actual lifestyle characteristics of the respective user.

At the process 310, if the one or more predicted lifestyle characteristics are different from the one or more actual lifestyle characteristics of the respective user, at leant one or more parameters of the machine learning model are adjusted. The one or more parameters are related to the one or more lifestyle characteristics associated with one or more driving behaviors of the respective user.

At the process 314, if the training has not been completed, the method 300 loops back to the process 304 to continue training the machine learning model with another set of training data.

Figure 4:
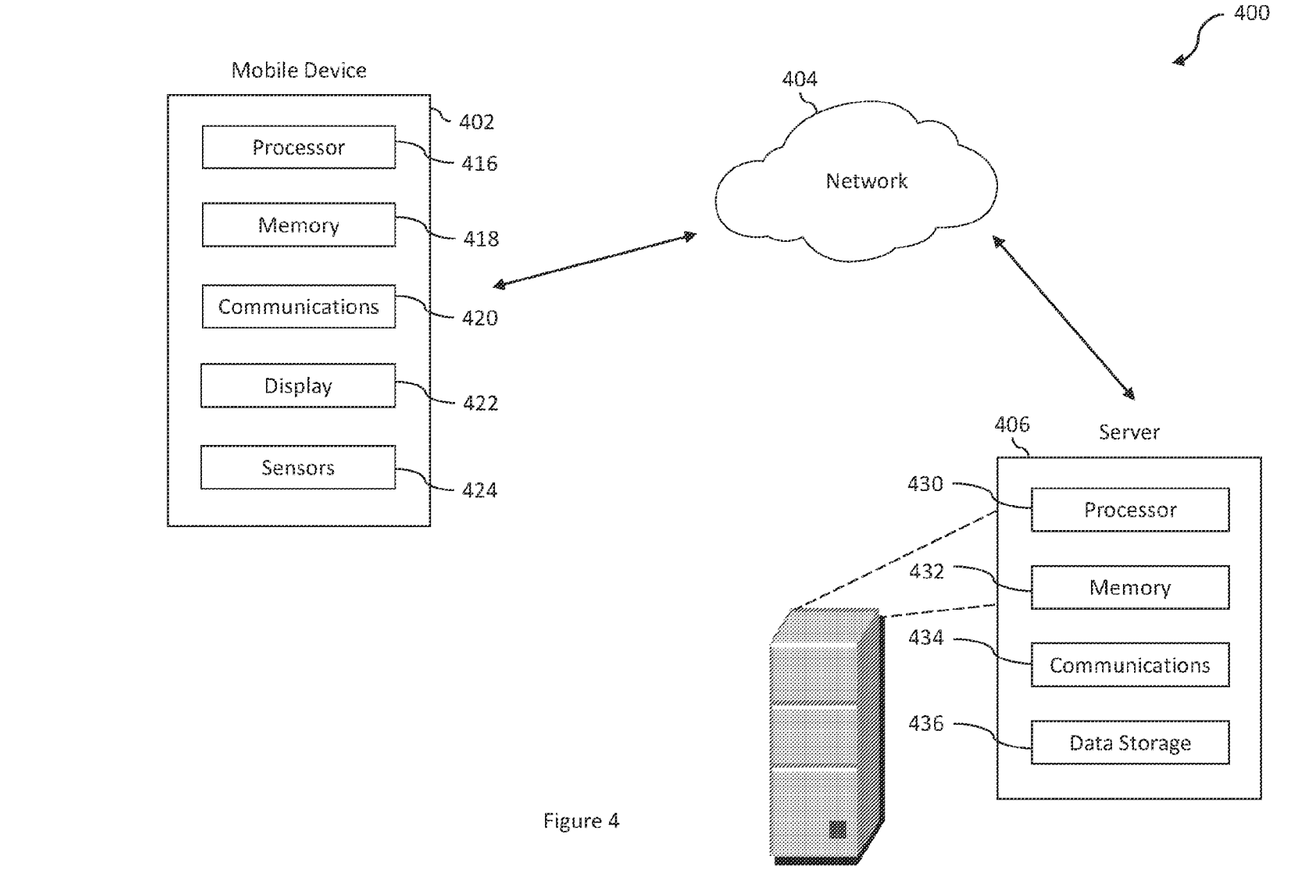
FIG. 4 is a diagram showing a system for generating a personalized landing page for a user according to certain embodiments of the present disclosure.

III. One or More Systems for Generating Personalized Landing Page for Users According to Certain Embodiments FIG. 4 is a simplified diagram showing a system for generating a personalized landing page for a user according to certain embodiments of the present disclosure. This diagram is merely an example, which should not unduly limit the scope of the claims. One of ordinary skill in the art would recognize many variations, alternatives, and modifications. In the illustrative embodiment, the system 400 includes a mobile device 402, a network 404, and a server 406. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 400 is used to implement the method 100, the method 200, and/or the method 300. According to certain embodiments, the mobile device 402 is communicatively coupled to the server 406 via the network 404. As an example, the mobile device 402 includes one or more processors 416 a central processing unit (CPU), a graphics processing unit (GPO), a memory 418 (e.g., random-access memory (RAM), read-only memory (ROM), flash memory), a communications unit 420 (e.g., a network transceiver), a display unit 422 (e.g., a touchscreen), and one or more sensors 424 (e.g., an accelerometer, a gyroscope, a magnetometer, a location sensor). For example, the one or more sensors 424 are configured to generate the driving data. According to some embodiments, the driving data are collected continuously, at predetermined time intervals, and/or based on a triggering event (e.g., when each sensor has acquired a threshold amount of sensor measurements).

In some embodiments, the mobile device 402 is operated by the user. For example, the user installs an application associated with an insurer on the mobile device 402 and allows the application to communicate with the one or more sensors 424 to collect data (e.g., the driving data). According to some embodiments, the application collects the data continuously, at predetermined time intervals, and/or based on a triggering event when each sensor has acquired a threshold amount of sensor measurements). In certain embodiments, the data is used to determine an amount of carbon emissions generated by the user's vehicle in the method 100, the method 200, and/or the method 300. As an example, the data represents the user's driving behaviors. According to some embodiments, there may be other drivers that drives the user's vehicle. In such embodiments, there may be multiple mobile devices (e.g., mobile devices of one or more drivers of the vehicle) that are in communication with the server 406.

According to certain embodiments, the collected data are stored in memory 418 before being transmitted to the server 406 using the communications unit 422 via the network 404 (e.g., via a local area network (LAN), a wide area network (WAN), the Internet). In some embodiments, the collected data are transmitted directly to the server 406 via the network 404. In certain embodiments, the collected data are transmitted to the server 406 via a third party. For example, a data monitoring system stores any and all data collected by the one or more sensors 424 and transmits those data to the server 406 via the network 404 or a different network.

According to certain embodiments, the server 406 includes a processor 430 (e.g., a microprocessor, a microcontroller), a memory 432, a communications unit 434 (e.g., a network transceiver), and a data storage 436 (e.g., one or more databases). In some embodiments, the server 406 is a single server, while in certain embodiments, the server 406 includes a plurality of servers with distributed processing. As an example, in FIG. 4, the data storage 436 is shown to be part of the server 406. In some embodiments, the data storage 436 is a separate entity coupled to the server 406 via a network such as the network 404. In certain embodiments, the server 406 includes various software applications stored in the memory 432 and executable by the processor 430. For example, these software applications include specific programs, routines, or scripts for performing functions associated with the method 100, the method 200, and/or the method 300. As an example, the software applications include general-purpose software applications for data processing, network communication, database management, web server operation, and/or other functions typically performed by a server.

According to various embodiments, the server 406 receives, via the network 404, the driving data collected by the one or more sensors 424 from the application using the communications unit 434 and stores the data in the data storage 436. For example, the server 406 then processes the data to perform one or more processes of the method 100, one or more processes of the method 200, and/or one or more processes of the method 300.

According to certain embodiments, the personalized landing page in the method 200 is transmitted to the mobile device 402, via the network 404, to be provided (e.g., displayed) to the user via the display unit 422.

In some embodiments, one or more processes of the method 100, one or more processes of the method 200, and/or one or more processes of the method 300 are performed by the mobile device 402. For example, the processor 416 of the mobile device 402 analyzes the driving data collected by the one or more sensors 424 to perform one or more processes of the method 100, one or more processes of the method 200, and/or one or more processes of the method 300.

IV. One or More Computer Devices According to Various Embodiments

Figure 5:
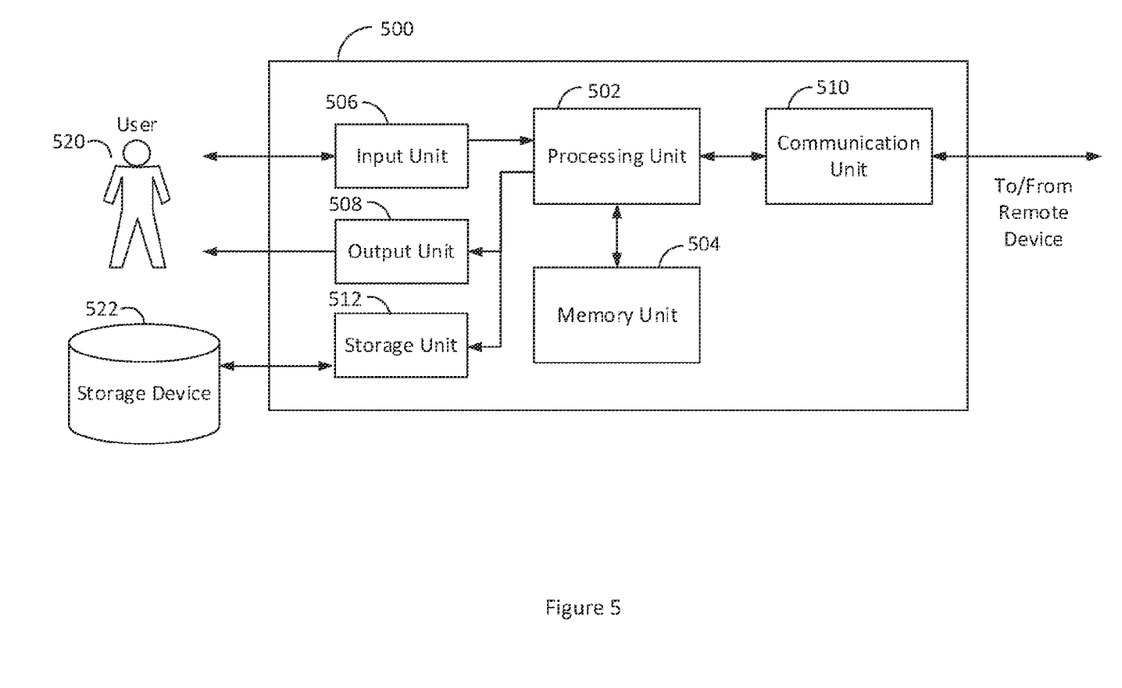
FIG. 5 is a simplified diagram showing a computing device, according to various embodiments of the present disclosure.

FIG. 5 is a simplified diagram showing a computer device 500, according to various embodiments of the present disclosure. This diagram is merely an example, which should not unduly limit the scope of the claims. One of ordinary skill in the art would recognize many variations, alternatives, and modifications. In some examples, the computer device 500 includes a processing unit 502, a memory unit 504, an input unit 506, an output unit 508, and a communication unit 510. In various examples, the computer device 500 is configured to be in communication with a user 520 and/or a storage device 522. In certain examples, the system computer device 500 is configured according to the system 400 of FIG. 4 to implement the method 100 of FIG. 1, the method 200 of FIG. 2, and/or the method 300 of FIG. 3. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the processing unit 502 is configured for executing instructions, such as instructions to implement the method 100 of FIG. 1, the method 200 of FIG. 2, and/or the method 300 of FIG. 3. In some embodiments, executable instructions may be stored in the memory unit 504. In some examples, the processing unit 502 includes one or more processing units (e.g., in a multi-core configuration). In certain examples, the processing unit 502 includes and/or is communicatively coupled to one or more modules for implementing the systems and methods described in the present disclosure. In some examples, the processing unit 502 is configured to execute instructions within one or more operating systems, such as UNIX, LINUX, Microsoft Windows®, etc. In certain examples, upon initiation of a computer-implemented method, one or more instructions is executed during initialization. In some examples, one or more operations is executed to perform one or more processes described herein. In certain examples, an operation may be general or specific to a particular programming language (e.g., C, C#, C++, Java, or other suitable programming languages, etc.). In various examples, the processing unit 502 is configured to be operatively coupled to the storage device 522, such as via an on-board storage unit 512.

In various embodiments, the memory unit 504 includes a device allowing information, such as executable instructions and/or other data to be stored and retrieved. In some examples, the memory unit 504 includes one or more computer readable media. In some embodiments, data stored in the memory unit 504 include computer readable instructions for providing a user interface, such as to the user 504, via the output unit 508. In some examples, a user interface includes a web browser and/or a client application. In various examples, a web browser enables one or more users, such as the user 504, to display and/or interact with media and/or other information embedded on a web page and/or a website. In certain examples, the memory unit 504 include computer readable instructions for receiving and processing an input, such as from the user 504, via the input unit 506. In certain examples, the memory unit 504 includes random access memory (RAM) such as dynamic RAM (DRAM) or static RAM (SRAM), read-only memory (ROM), erasable programmable read-only memory (EPROM), electrically erasable programmable read-only memory (EEPROM), and/or non-volatile RAM (NVRAN).

In various embodiments, the input unit 506 is configured to receive input, such as from the user 504. In some examples, the input unit 506 includes a keyboard, a pointing device, a mouse, a stylus, a touch sensitive panel (e.g., a touch pad or a touch screen), a gyroscope, an accelerometer, a position detector (e.g., a Global Positioning System), and/or an audio input device. In certain examples, the input unit 506, such as a touch screen of the input unit, is configured to function as both the input unit and the output unit.

In various embodiments, the output unit 508 includes a media output unit configured to present information by the user 504. In some embodiments, the output unit 508 includes any component capable of conveying information to the user 504. In certain embodiments, the output unit 508 includes an output adapter, such as a video adapter and/or an audio adapter. In various examples, the output unit 508, such as an output adapter of the output unit, is operatively coupled to the processing unit 502 and/or operatively coupled to an presenting device configured to present the information to the user, such as via a visual display device (e.g., a liquid crystal display (LCD), a light emitting diode (LED) display, an organic light emitting diode (MED) display, a cathode ray tube (CRT) display, an "electronic ink" display, a projected display, etc.) or an audio display device (e.g., a speaker arrangement or headphones).

In various embodiments, the communication unit 510 is configured to be communicatively coupled to a remote device. In some examples, the communication unit 510 includes a wired network adapter, a wireless network adapter, a wireless data transceiver for use with a mobile phone network (e.g., Global System for Mobile communications (GSM), 3G, 4G, or Bluetooth), and/or other mobile data networks (e.g., Worldwide Interoperability for Microwave Access (WIMAX)). In certain examples, other types of short-range or long-range networks may be used. In some examples, the communication unit 510 is configured to provide email integration for communicating data between a server and one or more clients.

In various embodiments, the storage unit 512 is configured to enable communication between the computer device 500, such as via the processing unit 502, and an external storage device 522. In some examples, the storage unit 512 is a storage interface. In certain examples, the storage interface is any component capable of providing the processing unit 502 with access to the storage device 522. In various examples, the storage unit 512 includes an Advanced Technology Attachment (ATA) adapter, a Serial ATA (BATA) adapter, a Small Computer System Interface (SCSI) adapter, a RAID controller, a SAN adapter, a network adapter, and/or any other component capable of providing the processing unit 502 with access to the storage device 522.

In some examples, the storage device 522 includes any computer-operated hardware suitable for storing and/or retrieving data. In certain examples, the storage device 522 is integrated in the computer device 500. In some examples, the storage device 522 includes a database, such as a local database or a cloud database. In certain examples, the storage device 522 includes one or more hard disk drives. In various examples, the storage device is external and is configured to be accessed by a plurality of server systems. In certain examples, the storage device includes multiple storage units such as hard disks or solid state disks in a redundant array of inexpensive disks (RAID) configuration. In some examples, the storage device 522 includes a storage area network (SAN) and/or a network attached storage (NAS) system.

V. Examples of Machine Learning According to Certain Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and ma be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

VI. Examples of Certain Embodiments of the Present Disclosure

According to some embodiments, a method for generating a personalized landing page for a user includes receiving one or more user data associated with the user. The one or more user data includes one or more telematics data of the user. The method further includes determining one or more user interface features based at least in part upon the one or more user data. Additionally, the method includes generating a personalized landing page customized for the user using the one or more user interface features to increase an effectiveness of the personalized landing page. For example, the method is implemented according to at least FIG. 1, FIG. 2, and/or FIG. 3.

According to some embodiments, a computing device for generating a personalized landing page for a user includes one or more processors and a memory that stores instructions for execution by the one or more processors. The instructions, when executed, cause the one or more processors to receive one or more user data associated with the user. The one or more user data includes one or more telematics data of the user. Further, the instructions, when executed, cause the one 0 or more processors to determine one or more user interface features based at least in part upon the one or more user data. Additionally, the instructions, when executed, cause the one or more processors to generate a personalized landing page customized for the user using the one or more user interface features to increase an effectiveness of the personalized landing page. For example, the computing device (e.g., the server 406) is implemented according to at least FIG. 4.

According to some embodiments, a non-transitory computer-readable medium stores instructions for generating a personalized landing page for a user. The instructions are executed by one or more processors of a computing device. The non-transitory computer-readable medium includes instructions to receive one or more user data associated with the user. The one or more user data includes one or more telematics data of the user. Further, the non-transitory computer-readable medium includes instructions to determine one or more user interlace features based at least in part upon the one or more user data. Additionally, the non-transitory computer-readable medium includes instructions to generate a personalized landing page customized for the user using the one or more user interface features to increase an effectiveness of the personalized landing page. For example, the non-transitory computer-readable medium is implemented according to at least FIG. 1, FIG. 2, FIG. 3, and/or FIG. 4.

VII. Additional Considerations According to Certain Embodiments

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a trait of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include mobile devices and servers. A mobile device and server are generally remote from each other and typically interact through a communication network. The relationship of mobile device and server arises by virtue of computer programs running on the respective computers and having a mobile device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for generating a personalized landing page for a user, the method comprising:
   receiving, by a computing device, one or more user data associated with the user, wherein the one or more user data include one or more telematics data of the user, wherein the one or more telematics data is, at least in part, received from one or more sensors located in a vehicle when the user is operating the vehicle, and wherein the one or more telematics data includes information related to one or more driving behaviors of the user;
   determining, by the computing device, one or more user interface features based at least in part upon the one or more user data; and
   generating, by the computing device, a personalized landing page customized for the user using the one or more user interface features to increase an interaction rate with the personalized landing page.

2. The computer-implemented method of claim 1, wherein the receiving the one or more user data associated with the user includes receiving, by the computing device, the one or more user data associated with the user from an application installed on a mobile device of the user.

3. The computer-implemented method of claim 1, further comprising presenting, in response to the user accessing an application, the personalized landing page to the user.

4. The computer-implemented method of claim 1, wherein the determining the one or more user interface features includes determining one or more lifestyle characteristics of the user based at least in part upon the one or more telematics data of the user.

5. The computer-implemented method of claim 4 wherein the determining the one or more user interface features further includes selecting the one or more user interface features from a plurality of user interface features through uplifting modeling based at least in part upon the one or more lifestyle characteristics of the user.

6. The computer-implemented method of claim 1, wherein the one or more user interface features includes a number of eternal trees the user has earned or planted.

7. The computer-implemented method of claim 1, wherein the one or more user interface features includes a ranking indicating how the user is ranked compared to other users in terms of carbon neutrality and/or driving ability.

8. The computer-implemented method of claim 1, wherein the generating the personalized landing page customized for the user using the one or more user interface features includes selecting the one or more user interface features to increase a likelihood of the user taking an action based on the personalized landing page.

9. The computer-implemented method of claim 8, wherein the selecting the one or more user interface features to increase the likelihood of the user taking the action based on the personalized landing page includes selecting the one or more user interface features to increase a likelihood of the user purchasing at least one item selected from a group consisting of a product and a service.

10. A computing device for generating a personalized landing page for a user, the computing device comprising:
a processor; and
a memory having a plurality of instructions stored thereon that, when executed by the processor, cause the computing device to:
receive one or more user data associated with the user, wherein the one or more user data include one or more telematics data of the user, wherein the one or more telematics data is, at least in part, received from one or more sensors located in a vehicle when the user is operating the vehicle, and wherein the one or more telematics data includes information related to one or more driving behaviors of the user;
determine one or more user interface features based at least in part upon the one or more user data; and
generate a personalized landing page customized for the user using the one or more user interface features to increase an interaction rate with the personalized landing page.

11. The computing device of claim 10, wherein the plurality of instructions, when executed, further cause the computing device to present, in response to the user accessing an application, the personalized landing page to the user.

12. The computer-implemented method of claim 1, wherein the one or more driving behaviors of the user include one or more of a driving habit, a driving pattern, a place that the user has been, a braking behavior, a steering behavior, an acceleration behavior, a maneuvering behavior, or a proximity behavior.

13. The computing device of claim 10, wherein to receive the one or more user data associated with the user includes to receive the one or more user data associated with the user from an application installed on a mobile device of the user.

14. The computing device of claim 13, wherein to determine the one or more user interface features includes to determine one or more lifestyle characteristics of the user based at least in part upon the one or more telematics data of the user.

15. The computing device of claim 14, wherein to determine the one or more user interface features further includes to select the one or more user interface features from a plurality of user interface features through uplifting modeling based at least in part upon the one or more lifestyle characteristics of the user.

16. The computing device of claim 13, wherein the one or more user interface features includes a number of eternal trees the user has earned or planted.

17. The computing device of claim 13, wherein the one or more user interface features includes a ranking indicating how the user is ranked compared to other users in terms of carbon neutrality and/or driving ability.

18. The computing device of claim 13, wherein to generate the personalized landing page customized for the user using the one or more user interface features includes to select the one or more user interface features to increase a likelihood of the user taking an action based on the personalized landing page.

19. The computing device of claim 18, wherein to select the one or more user interface features to increase the likelihood of the user taking the action based on the personalized landing page includes to select the one or more user interface features to increase a likelihood of the user purchasing at least one item selected from a group consisting of a product and a service.

20. The computing device of claim 13, wherein the one or more driving behaviors of the user include one or more of a driving habit, a driving pattern, a place that the user has been, a braking behavior, a steering behavior, an acceleration behavior, a maneuvering behavior, or a proximity behavior.

* * * * *